United States Patent
Harp et al.

(10) Patent No.: US 9,750,663 B2
(45) Date of Patent: Sep. 5, 2017

(54) SYSTEMS, METHODS, APPARATUSES, AND COMPUTER PROGRAM PRODUCTS FOR PROVIDING INTERIM VOLUME VERIFICATION OF A FLUID

(71) Applicant: AESYNT, Cranberry, PA (US)

(72) Inventors: Maureen Harp, Freedom, PA (US); William Meyer, Wexford, PA (US); David Deutsch, Cranberry Township, PA (US)

(73) Assignee: Aesynt, Cranberry, PA (US)

( * ) Notice: Subject to any disclaimer, the term of this patent is extended or adjusted under 35 U.S.C. 154(b) by 619 days.

(21) Appl. No.: 14/230,742

(22) Filed: Mar. 31, 2014

(65) Prior Publication Data
US 2015/0274329 A1    Oct. 1, 2015

(51) Int. Cl.
| | |
|---|---|
| *A61J 1/22* | (2006.01) |
| *A61J 1/20* | (2006.01) |
| *G01F 25/00* | (2006.01) |
| *A61J 1/06* | (2006.01) |
| *A61J 1/10* | (2006.01) |
| *G01F 23/26* | (2006.01) |
| *G01F 23/292* | (2006.01) |

(52) U.S. Cl.
CPC . *A61J 1/22* (2013.01); *A61J 1/20* (2013.01); *G01F 25/0092* (2013.01); *A61J 1/06* (2013.01); *A61J 1/10* (2013.01); *A61J 2200/76* (2013.01); *G01F 23/263* (2013.01); *G01F 23/292* (2013.01)

(58) Field of Classification Search
CPC ........ A61J 1/20; A61J 1/22; A61J 1/10; A61J 1/06; A61J 2200/76; G01F 11/00
USPC ........ 141/1, 4–8, 94–95; 73/1.73, 861, 195, 73/198
See application file for complete search history.

(56) References Cited

U.S. PATENT DOCUMENTS

| | | | | |
|---|---|---|---|---|
| 3,811,484 | A | * | 5/1974 | Engelbrecht .......... B01L 3/0293 141/230 |
| 4,582,480 | A | * | 4/1986 | Lynch .................. B01D 1/0082 261/121.1 |
| 4,854,355 | A | * | 8/1989 | Chazot ..................... G01N 1/14 141/130 |
| 4,859,375 | A | * | 8/1989 | Lipisko ............... C23C 16/4482 137/209 |

(Continued)

*Primary Examiner* — Nicolas A Arnett
(74) *Attorney, Agent, or Firm* — Alston & Bird LLP (57) ABSTRACT

A system, method, apparatus, and computer program product are provided for interim volume verification. A system may include a first fluid container defining a first cavity, a second fluid container defining a second cavity, and a third fluid container defining a third cavity. Systems may include a pneumatic valve, where the pneumatic valve may be in pneumatic communication with the second cavity of the second fluid container. A controller may be configured to control the pneumatic valve. Systems may include a display configured to present a volume measurement to a user. A target volume of fluid may be caused by the controller to be drawn from the first cavity of the first fluid container into the second cavity of the second fluid container in response to the first cavity of the first fluid container being in fluid communication with the second cavity of the second container and the pneumatic valve causing a vacuum to be applied to the second cavity of the second fluid container.

19 Claims, 6 Drawing Sheets

(56) References Cited

U.S. PATENT DOCUMENTS

| | | | | |
|---|---|---|---|---|
| 6,397,906 B2* | 6/2002 | Hansen | G01F 15/003 | 141/196 |
| 6,499,517 B2* | 12/2002 | Hansen | G01F 15/003 | 141/196 |
| 6,588,458 B2* | 7/2003 | Rodgers | G05D 9/12 | 141/100 |
| 7,117,901 B2* | 10/2006 | Martinell Gisper-Sauch | B65B 3/003 | 141/2 |
| 7,198,073 B2* | 4/2007 | Luehrsen | B01F 13/1055 | 141/301 |
| 7,753,085 B2* | 7/2010 | Tribble | A61J 3/002 | 141/104 |
| 7,789,111 B2* | 9/2010 | Luehrsen | B01F 13/1058 | 141/104 |
| 7,900,658 B2* | 3/2011 | Osborne | A61J 1/20 | 141/104 |
| 8,011,394 B2* | 9/2011 | Luehrsen | B01F 13/1058 | 141/104 |
| 8,191,339 B2* | 6/2012 | Tribble | A61J 3/002 | 53/281 |
| 8,220,503 B2* | 7/2012 | Tribble | A61J 3/002 | 141/104 |
| 8,678,047 B2* | 3/2014 | Tribble | A61J 3/002 | 141/104 |
| 8,960,220 B2* | 2/2015 | Rodgers | G01G 17/06 | 137/334 |
| 9,382,021 B2* | 7/2016 | Tribble | B65B 3/003 | |
| 2002/0117232 A1* | 8/2002 | Gisper-Sauch | B65B 3/003 | 141/2 |
| 2002/0139437 A1* | 10/2002 | Hansen | G01F 15/003 | 141/196 |
| 2007/0125442 A1* | 6/2007 | Tribble | A61J 3/002 | 141/27 |
| 2008/0169043 A1* | 7/2008 | Osborne | A61J 1/20 | 141/1 |
| 2008/0169045 A1* | 7/2008 | Tribble | B65B 59/00 | 141/1 |
| 2010/0161113 A1* | 6/2010 | Tribble | A61J 3/002 | 700/225 |
| 2010/0217431 A1* | 8/2010 | Tribble | A61J 3/002 | 700/213 |
| 2011/0108157 A1* | 5/2011 | Scharger | B65B 1/16 | 141/1 |
| 2012/0138631 A1* | 6/2012 | Lurcott | B01F 3/0861 | 222/1 |
| 2013/0000250 A1* | 1/2013 | Tribble | A61J 3/002 | 53/167 |
| 2015/0321897 A1* | 11/2015 | Lurcott | B01F 3/0861 | 222/1 |

* cited by examiner

SYSTEMS, METHODS, APPARATUSES, AND COMPUTER PROGRAM PRODUCTS FOR PROVIDING INTERIM VOLUME VERIFICATION OF A FLUID

TECHNOLOGICAL FIELD

Embodiments of the present invention relate generally to accurately dispensing a predetermined volume of a fluid to a medication delivery device, and more particularly, to systems, methods, apparatuses, and computer program products for drawing a predetermined volume of fluid from a fluid source container into an interim volume verification container, verifying the volume drawn, and expelling the volume of fluid to a medication delivery device, such as an intravenous bag.

BACKGROUND

The precise measurement and dispensing of fluid is critical in various fields. Fields such as baking and chemical production may require precise fluid measurements, but perhaps in no field is it more critical than in the medical field. The proper measurement of fluids, whether in drug compounding or drug dose preparation, is critical to the well-being of the patient. In many instances, the measurement of fluid must be verified by authorized personnel before the fluid can be dispensed to a patient. In such instances, the efficiency of fluid dispensing may be sacrificed for the safety and/or regulatory requirements. Accordingly, it may be desirable to improve the efficiency of fluid dispensing without compromising accuracy.

BRIEF SUMMARY

Systems, methods, apparatuses, and computer program products are herein provided for dispensing a predetermined volume of fluid to a medication delivery device. Systems, methods, and apparatuses in accordance with various embodiments provide several advantages to conventional methods of fluid dispensing and the verification thereof. In this regard, some example embodiments provide a system for volume verification of a medication including a first fluid container defining a first cavity, a second fluid container defining a second cavity, and a third fluid container defining a third cavity. Systems may include a pneumatic valve, where the pneumatic valve may be in pneumatic communication with the second cavity of the second fluid container. A controller may be configured to control the pneumatic valve. Systems may include a display configured to present a volume measurement to a user. A target volume of fluid may be caused by the controller to be drawn from the first cavity of the first fluid container into the second cavity of the second fluid container in response to the first cavity of the first fluid container being in fluid communication with the second cavity of the second container and the pneumatic valve causing a vacuum to be applied to the second cavity of the second fluid container. The target volume of fluid may be caused by the controller to be expelled to the third cavity of the third fluid container from the second fluid container in response to the third cavity of the third fluid container being in fluid communication with the second cavity of the second fluid container and the pneumatic valve causing a pressure to be applied to the second cavity of the second fluid container.

According to some embodiments, the controller may be configured to receive an indication of the target volume, and the controller may be configured to control the pneumatic valve to draw the target volume of fluid into the second cavity of the second fluid container in response to the controller receiving the indication of the target volume. Systems may include a volume measurement apparatus which may determine a volume of fluid in the second fluid container. The volume measurement apparatus may include a capacitive sensor configured to read a fluid level of the second fluid container. Optionally, the volume measurement apparatus may include an optical sensor configured to read a fluid level of the second fluid container. The display may be configured to present a volume measured by the volume measurement apparatus. Systems may include an image capture device configured to capture an image of the second fluid container with the first volume of fluid. Systems may optionally include an image capture device configured to capture an image of the first fluid container and identifying indicia related thereto. The image of the second fluid container with the target volume of fluid and the image of the first fluid container may be stored as a record of a fluid transfer event.

Embodiments of the present invention may provide a method for volume verification of a medication including placing a first cavity of a first fluid container in fluid communication with a second cavity of a second fluid container. A vacuum may be applied using a pneumatic valve, to the second cavity of the second fluid container and drawing fluid from the first cavity of the first fluid container into the second cavity of the second fluid container in response to the vacuum being applied to the second fluid container. A volume of the fluid drawn from the first cavity into the second cavity may be measured and the vacuum may cease to be applied to the second cavity in response to the volume of fluid drawn into the second cavity reaching a target volume. A third cavity of a third fluid container may be placed in fluid communication with the second cavity of the second fluid container, pressure may be applied, using the pneumatic valve, to the second cavity of the second fluid container to drive the target volume of fluid from the second cavity to the third cavity of the third fluid container.

According to some embodiments, the pneumatic valve may be controlled by a controller, and the volume may be measured using the controller. Measuring the volume of fluid drawn into the second cavity may be performed by a capacitive sensor configured to read a fluid level of the second fluid container. Measuring the volume of fluid drawn into the second cavity may be performed by an optical sensor configured to read a fluid level of the second fluid container. Methods may include capturing an image of the second fluid container with the target volume of fluid and/or capturing an image of the first fluid container including identifying indicia thereof. Methods may include storing the image of the second fluid container with the target volume of fluid and the image of the first fluid container in a record of a fluid transfer. According to some embodiments, a label may be printed for the third fluid container including an indication of the target volume. Methods may include receiving a target volume and a fluid type, receiving an identification of the first fluid container including a type of fluid contained therein, and verifying that the type of fluid of the first fluid container corresponds to the fluid type.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Embodiments of the present invention may be used for accurately and repeatably dispensing a predetermined volume of fluid to a container using an interim volume verification container. While embodiments described herein are directed to a medical environment, such as a healthcare facility or compounding pharmacy, embodiments of the present invention may be implemented in any environment in which accurate dispensing of a predetermined volume of fluid is necessary.

Figure 1:
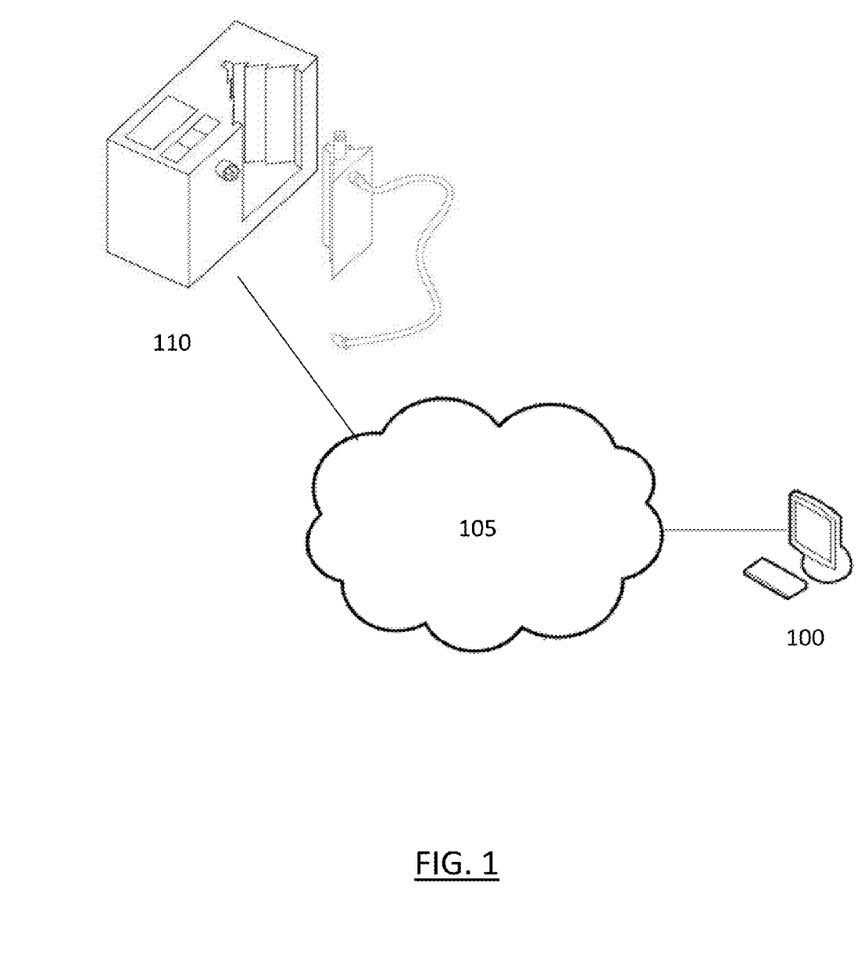
FIG. 1 illustrates a system for interim volume verification according to an example embodiment of the present invention.

FIG. 1 illustrates a system for dispensing a predetermined volume of fluid to an interim volume container for volume verification, and subsequent expulsion of the fluid to a medication delivery device. It will be appreciated that the system, as well as the illustrations in other figures, are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for interim volume verification, numerous other configurations may also be used to implement embodiments of the present invention.

FIG. 1 depicts a system that can be used in conjunction with various embodiments of the present invention. As shown in FIG. 1, an example embodiment of the interim volume verification system may include an interim volume verification system controller 100, one or more networks 105, and one or more interim volume verification systems 110. Embodiments may include other network entities from which data may be received from or transmitted to as will be described further below. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates the various system entities as separate, standalone entities, the various embodiments are not limited to this particular architecture.

Figure 2:
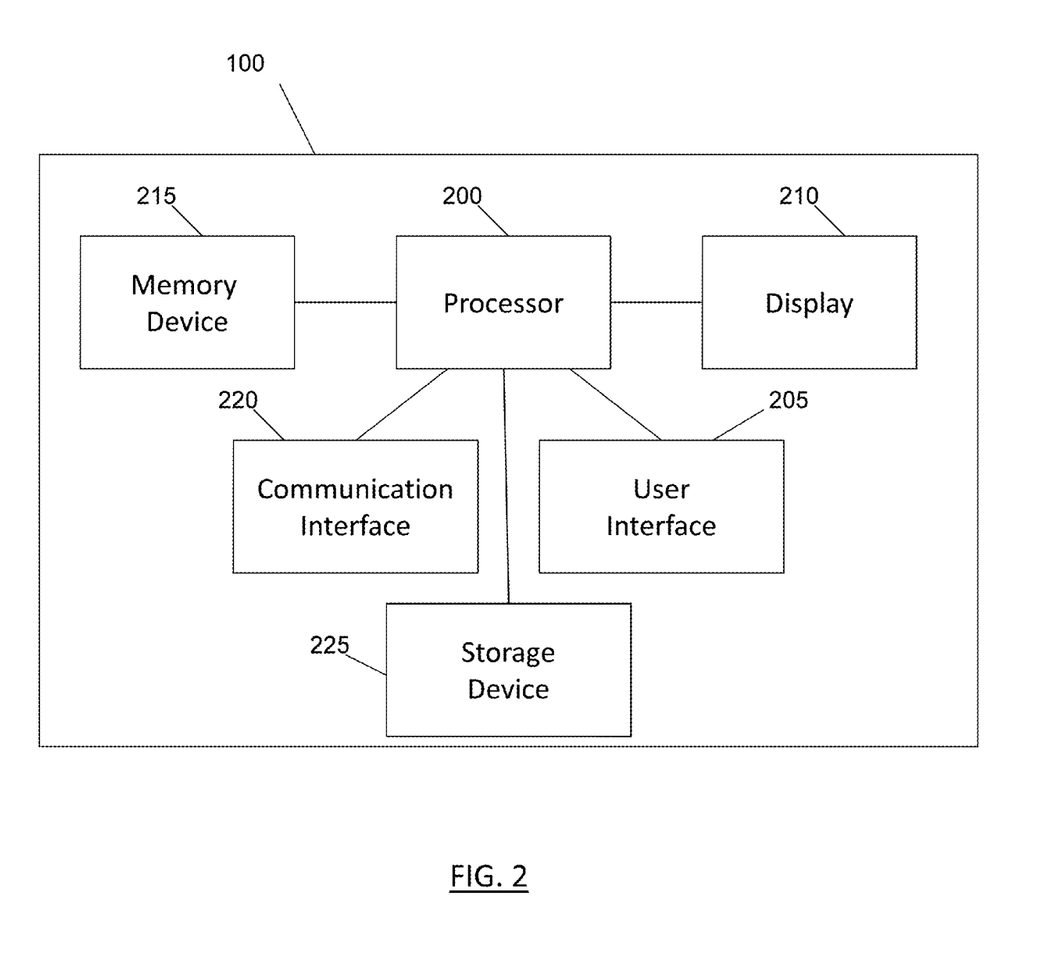
FIG. 2 depicts a controller for an interim volume verification system according to an example embodiment of the present invention.

FIG. 2 provides a schematic of an interim volume verification system controller 100 according to one embodiment of the present invention. In general, the term "controller" may refer to, for example, any computer, computing device, mobile phone, desktop, tablet, notebook or laptop, distributed system, server, blade, gateway, switch, processing device, or combination of processing devices adapted to perform the functions described herein. The interim volume verification system controller 100 may include, be associated with, or be in communication with a variety of computing entities, such as pharmacy order management systems, medication dispensing units, data storage/facilitation computing entities, or other devices that may interface with inventory management, dispensing, replenishing, etc. While example embodiments of interim volume verification systems may be implemented in virtually any setting which may benefit from accurate and repeatable predetermined volume dispensing, embodiments described herein will be described generally with respect to the field of healthcare in which medications may be prepared through the measurement of one or more fluids. However, it is appreciated that embodiments of the present invention may apply to various other embodiments of interim volume verification systems.

As will be understood from this figure, in one embodiment, the interim volume verification system controller 100 may include a processor 200 that communicates with other elements within the interim volume verification system controller 100 via a system interface or bus. The processor 200 may be embodied in a number of different ways. For example, the processor 200 may be embodied as a processing element, processing circuitry, a coprocessor, a controller or various other processing devices including integrated circuits such as, for example, an application specific integrated circuit (ASIC), a field programmable gate array (FPGA), a hardware accelerator, and/or the like.

In an exemplary embodiment, the processor 200 may be configured to execute instructions stored in memory or otherwise accessible to the processor 200. As such, whether configured by hardware or software methods, or by a combination thereof, the processor 200 may represent an entity capable of performing operations according to embodiments of the present invention when configured accordingly. For example, as discussed in more detail below, the interim volume verification system controller 100 may be configured, among other things, to receive medication orders. A user interface 205 may be configured for user input of medication orders or to otherwise interact with existing orders. The user interface 205 may include a keyboard, a pointing device, or other mechanism for a user to communicate with the processor 200 and interact with the interim volume verification system controller 100. A display 210 may be configured to present information to a user pertaining to previous orders, current orders, or future orders for medications. The display 210 may also be configured to present information to a user pertaining to the status of the interim volume verification system, information regarding inventory, or any information which may be useful to a user of the device. The display 210 may include a touch screen display which may partially or fully comprise the user interface 205.

The interim volume verification system controller 100 may further include transitory and non-transitory memory device 215, which may include both random access memory (RAM) and read only memory (ROM). The ROM may be used to store a basic input/output system (BIOS) containing the basic routines that help to transfer information to the different elements within the interim volume verification system controller 100.

In addition, in one embodiment, the interim volume verification system controller 100 may include at least one storage device 225, such as a hard disk drive, a CD drive, and/or an optical disk drive for storing information on various computer-readable media. The storage device(s) 225 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like.

Furthermore, a number of executable instructions, applications, scripts, program modules, and/or the like may be stored by the various storage devices 225 and/or within memory device 215. As discussed in more detail below, these executable instructions, applications, program modules, and/or the like may control certain aspects of the operation of the interim volume verification system controller 100 with the assistance of the processor 200 and operating system, although their functionality need not be modularized. In addition to the program modules, the interim volume verification system controller 100 may store or be in communication with one or more databases.

Also located within the interim volume verification system controller 100, in one embodiment, is a communication interface 220 for interfacing with various computing entities. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the interim volume verification system controller 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more of the interim volume verification system controller's 100 components may be located remotely from other dispensing system controller 100 components. Furthermore, one or more of the components may be combined and additional components performing functions described herein may be included in the interim volume verification system controller 100.

Figure 3:
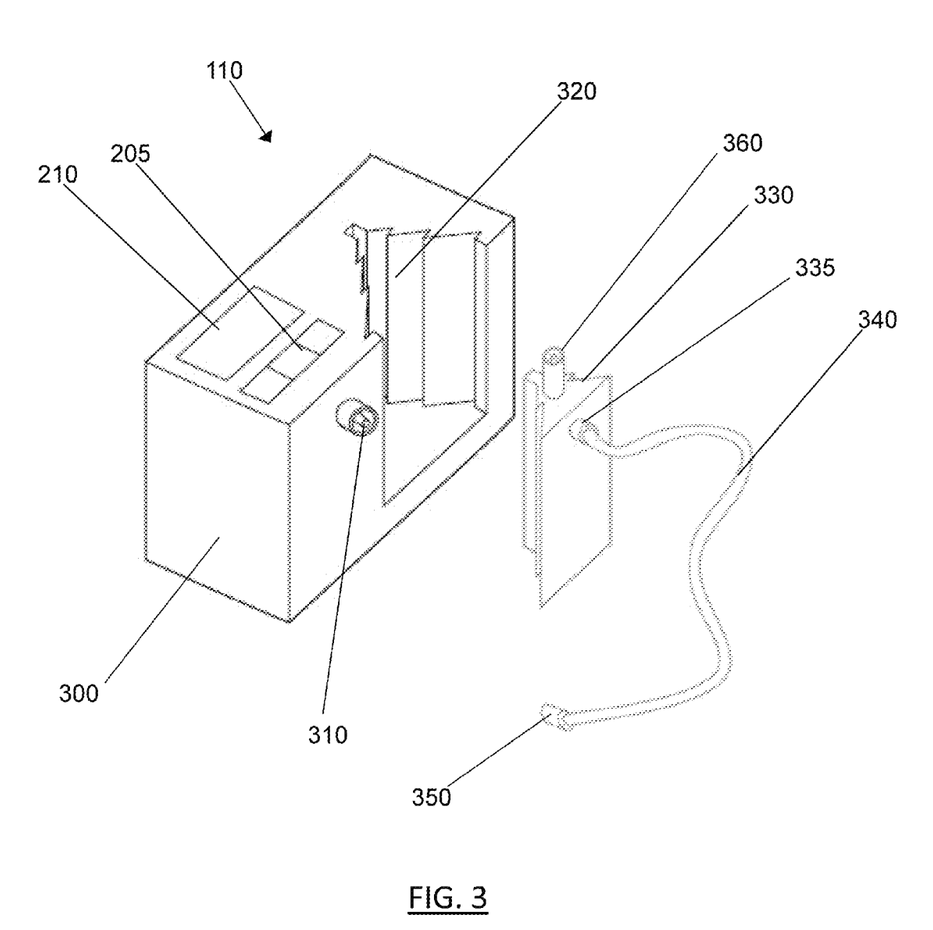
FIG. 3 illustrates an interim volume verification system according to an example embodiment of the present invention.

FIG. 3 illustrates an example embodiment of an interim volume verification system. While FIG. 1 depicts an interim volume verification system 110 and controller 100 as distinct entities, which may communicate via, for example, network 105, embodiments may include an interim volume verification system 110 as shown in FIG. 3 with an integrated controller including the user interface 205 and display 210. The interim volume verification system 110 may include a housing 300, which may conceal a pneumatic pump (not shown). Optionally, the interim volume verification system 110 may be plumbed to an air pressure or air vacuum source in a facility in which the interim volume verification system is installed. The pneumatic pump and/or the external air pressure/vacuum source can be used by the interim volume verification system of example embodiments to provide both positive air pressure and negative air pressure in dependence of the need, as will be described further below.

The illustrated embodiment of an interim volume verification system shown in FIG. 3 further includes a pneumatic port 310. The housing may include one or more recesses 320 configured to receive therein one or more sizes of interim volume fluid container 330. The system 110 may further include a conduit 340 arranged to be connected between the pneumatic port 310 of the housing 300 and a pneumatic port 335 of the interim volume fluid container 330. The conduit 340 may include a connector or luer 350 arranged on each end to connect to a respective one of the pneumatic ports 310, 335. When the conduit 340 is connected at one end to the pneumatic port 310 of the housing 300 and at the other end to the pneumatic port 335 of the interim volume fluid container 330, the pneumatic pump, or the air supply to the housing 300 is in pneumatic communication with the interim volume fluid container 330. The housing may be configured to receive a plurality of shapes and/or sizes of interim volume fluid containers to accommodate interim volumes of various sizes.

Figure 4:
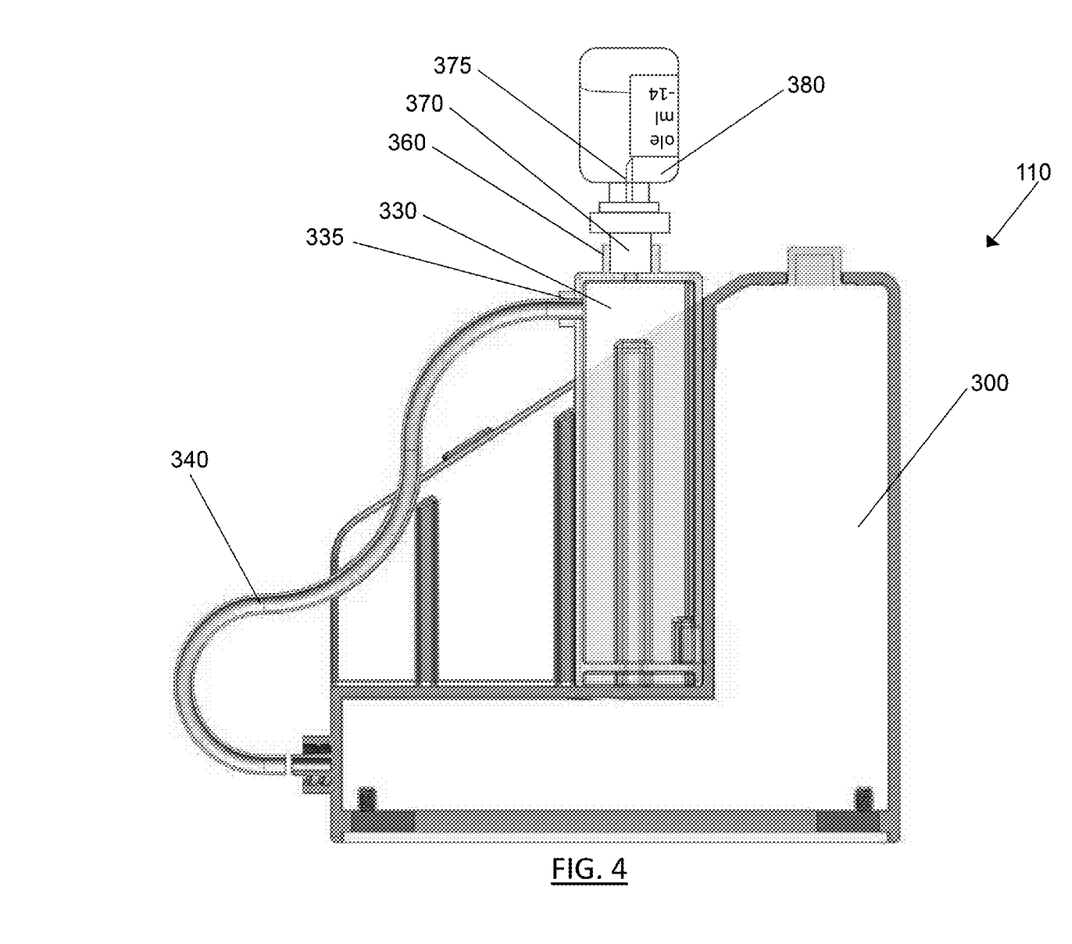
FIG. 4 illustrates a cut-away view of an interim volume verification system in a position to extract fluid from a fluid source container according to an example embodiment of the present invention.

Example embodiments of an interim volume verification system may be configured to draw fluid from a source fluid container into the interim volume fluid container 330 for measurement and volume verification. FIG. 4 illustrates an example embodiment of an interim volume verification system 110 in a cut-away view for ease of illustration and understanding. The depicted embodiment includes source fluid container 380, which in the illustrated embodiment includes a medication vial. The cavity of the interim volume fluid container 330 may be placed in fluid communication with the cavity of the source fluid container 380. The interim volume fluid container 330 may further include a connector or luer 360. Optionally, as depicted in FIG. 4, a luer 370 may be connected to the connector 360 of the interim volume fluid container 330 that is compatible with the type of source fluid container 380. In the instant embodiment, the luer 370 may include a connector on one end to attach to the connector 360 of the interim volume fluid container 330 and a needle 375 on the other end to be inserted into the source fluid container 380.

With the cavity of the source fluid container 380 in fluid communication with the cavity of the interim volume fluid container 330, the interim volume verification system may receive, for example, at controller 100, an indication of the volume of fluid to be drawn from the source fluid container 380. This volume may be received, for example, from a medication order system, and/or the volume may be entered by a user of the interim volume verification system, such as via user interface 205. A user may also confirm to the controller that the cavity of the source fluid container 380 is in fluid communication with the cavity of the interim volume fluid container 330 through user interface 205. The controller 100 may subsequently cause the pneumatic pump or the air supply to the housing 300, via a pneumatic valve controlled by the controller, to draw a vacuum on the interim volume fluid container 330 through the conduit 340. The vacuum drawn on the cavity of the interim volume fluid container 330 may cause the fluid from the source fluid container 380 to be drawn into the interim volume fluid container 330 cavity. The interim volume fluid container 330 and the connector 335 may be arranged in such a way that it is exclusively air that is drawn through the conduit 340 and that no fluid from the fluid source container 380 is drawn into the conduit 340.

As the fluid is drawn from the source fluid container 380 into the cavity of the interim volume fluid container 330, the volume of fluid in the interim volume fluid container 330 may be measured. The volume may be measured in a number of ways. The volume of fluid within the interim volume fluid container 330 may be measured by an optical fluid level detection system which measures the height of fluid in the interim volume fluid container 330 and determines the volume based upon the geometry of the interim volume fluid container, which may be stored within storage device 225 of controller 100. The storage device 225 may store information for a plurality of configurations of interim volume fluid containers, and the type of interim volume fluid container may be entered by a user via the user interface 205 of the controller 100, or the type of interim volume fluid container may be detected by the interim volume verification system through, for example, a radio frequency identification (RFID) tag or other identification means of the container by communication interface 220. Another method of determining the volume of fluid within the interim volume fluid container may include capacitive volume sensing. In such an embodiment, the interim volume fluid container 330 may include electrical contacts which may be used to detect a fluid level within the container based upon the capacitance of the fluid detected, such as by the controller 100. The controller may determine volume based on fluid level as established with the optical fluid level sensing method.

The volume of fluid within the interim volume fluid container 330 cavity may be measured during the process of drawing the fluid from the fluid source container 380. The vacuum applied to the interim volume fluid container 330 cavity through conduit 340 may be varied in dependence of the volume of fluid in the interim volume fluid container 330. For example, the vacuum may initially be raised to a relatively high level (i.e., a relatively strong negative pressure) such that fluid is drawn into the interim volume fluid container relatively quickly. As the volume of fluid in the interim volume fluid container 330 approaches the target volume of fluid, as determined by the volume detection of the controller 100, the vacuum may be reduced (i.e., a relatively weaker negative pressure) to slow the flow of fluid from the source fluid container 380 into the interim volume fluid container 330. Upon reaching the target volume in the interim volume fluid container, the vacuum to the interim volume fluid container may be stopped, thereby ceasing the flow of fluid from the source fluid container 380 into the interim volume fluid container 330. This variation in the vacuum or pressure applied to a cavity of a container may be performed by a pneumatic valve that is responsive to the controller 100. The pneumatic valve may be actuatable by the controller 100 to cause either a positive or a negative pressure to be exerted upon a cavity of a container that is in pneumatic communication with the housing via conduit 340.

Once the target volume of fluid is in the cavity of the interim volume fluid container 330 and there ceases to be a vacuum pulled through conduit 340, the source fluid container 380 may be removed. At this time, a verification of the volume of fluid drawn from the source fluid container 380 may be performed. This verification step may be performed manually by an authorized person, such as a pharmacist. Optionally, the verification may include capturing an image of the interim volume fluid container 330 and the fluid therein, together with a volume measurement from the controller. This image and volume may be stored as part of a record of the fluid transfer process, and may be stored for later review, such as during an audit of the preparation of a particular medication. This record may be appended, for example, to a patient's electronic medical record if the medication is being prepared for that specific patient.

Figure 5:
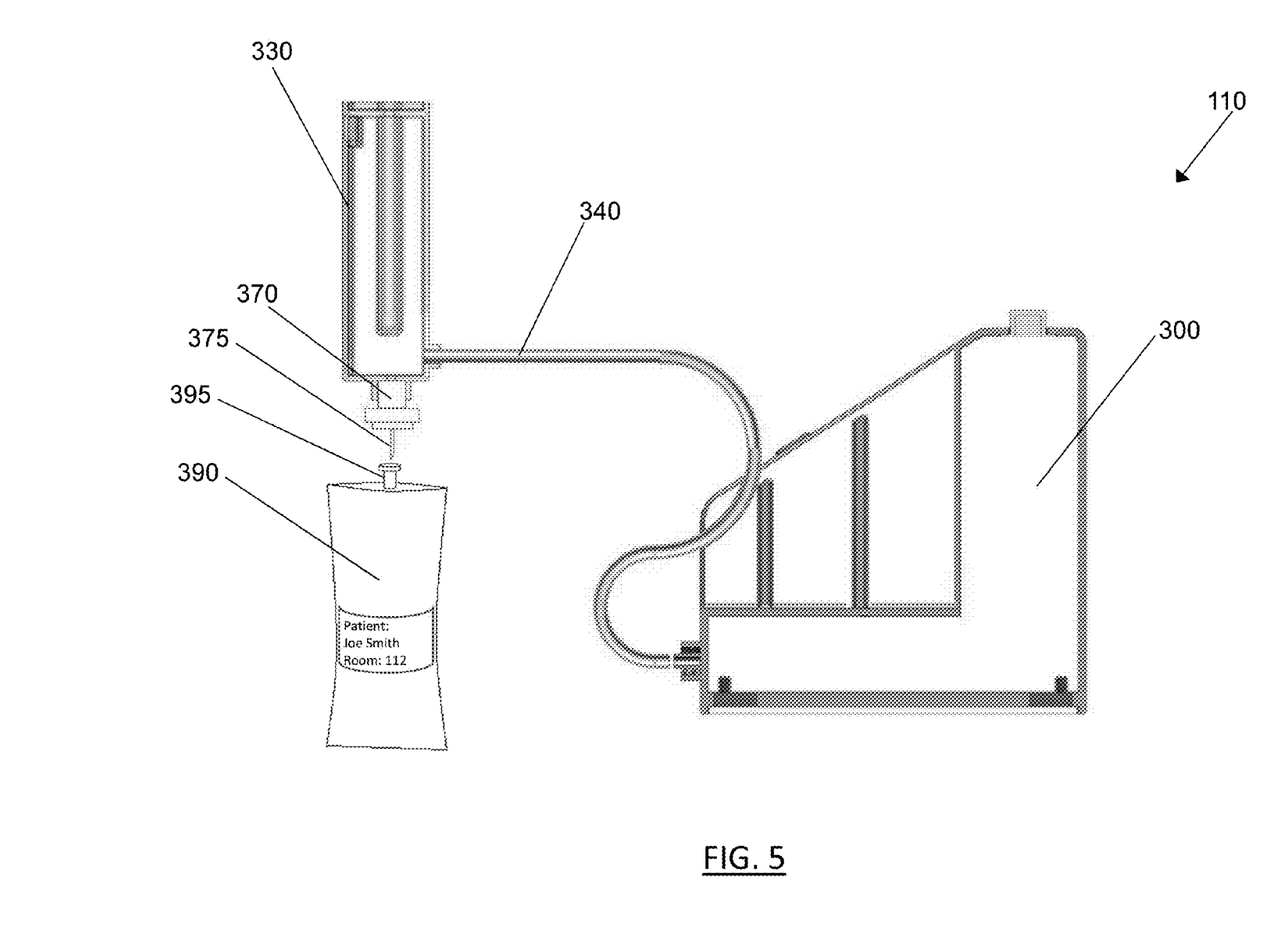
FIG. 5 illustrates the cut-away view of the interim volume verification system of FIG. 4 in a position to expel fluid from the interim volume fluid container according to an example embodiment of the present invention.

Upon completing the verification step, the interim volume fluid container 330 may be removed from the housing 300. A recipient fluid container 390, such as an intravenous bag, may be the destination for the fluid extracted from the fluid source container 380, as shown in FIG. 5. The recipient fluid container may include a connector that may be compatible with the luer 370 already attached to the interim volume fluid container 330, or alternatively a different style or type of connector or luer may be attached to the interim volume fluid container 330 in place of the luer 370 used for the fluid source container 380.

As illustrated in FIG. 5, the needle 375 of luer 370 may be inserted into the connector 395 of the recipient fluid container 390. The user may indicate to the controller 100, such as through user interface 205, that the cavity of interim volume fluid container 330 is in fluid communication with the cavity of the recipient fluid container 390. The interim volume fluid container 330 may also be inverted to cause the fluid therein to be proximate the luer 370. In response to the indication, the pneumatic pump or air source, via the pneumatic valve, may be configured to apply a positive pressure to the cavity of the interim volume fluid container 330 via conduit 340 as controlled by the controller 100. The positive pressure within the cavity of the interim volume fluid container 330 may drive the fluid from the interim volume fluid container into the recipient fluid container 390. The degree of pressurized air may be varied such that a relatively strong positive pressure may be supplied to the cavity of the interim volume fluid container 330 initially to drive the fluid into the recipient fluid container 390, and as the target volume of fluid is approached, the pressure to the cavity of the interim volume fluid container 330 may be reduced. Once the fluid from the interim volume fluid container 330 has been expelled to the recipient fluid container 390, the positive air pressure to the cavity of the interim volume fluid container may be stopped. The recipient fluid container 390 may be removed from the luer 370 and the recipient fluid container may be ready for dispensing.

According to some embodiments of the present invention, the interim volume verification system may be in communication with a printer. In response to receiving a medication order, the interim volume verification system may be configured to print a label for a recipient fluid container 390, such as an intravenous bag. This label may be applied upon completion of the preparation of the recipient fluid container 390.

Optionally, the recipient fluid container may arrive at the interim volume verification system with a label in place. An identification apparatus, such as a barcode scanner, may be configured to scan a barcode disposed on the label of the recipient fluid container. The label on the recipient fluid container may provide an indication of the type of medication that is to be dispensed to the recipient fluid container, the volume of fluid, and optionally, an intended recipient of the medication. The interim volume verification system controller 100 may interpret this information in order to determine the volume that is to be drawn from a fluid source container. Further, the identity of the fluid source container may be known to the controller 100 such that prior to fluidly coupling the fluid source container with the interim volume fluid container, the controller may prompt a user to identify the fluid source container, such as through scanning with the identification apparatus. The controller 100 may then confirm that the fluid source container is correct, and allow the fluid transfer and volume verification process to proceed. If the fluid source container is incorrect, the controller may preclude the interim volume verification process from occurring.

Figure 6:
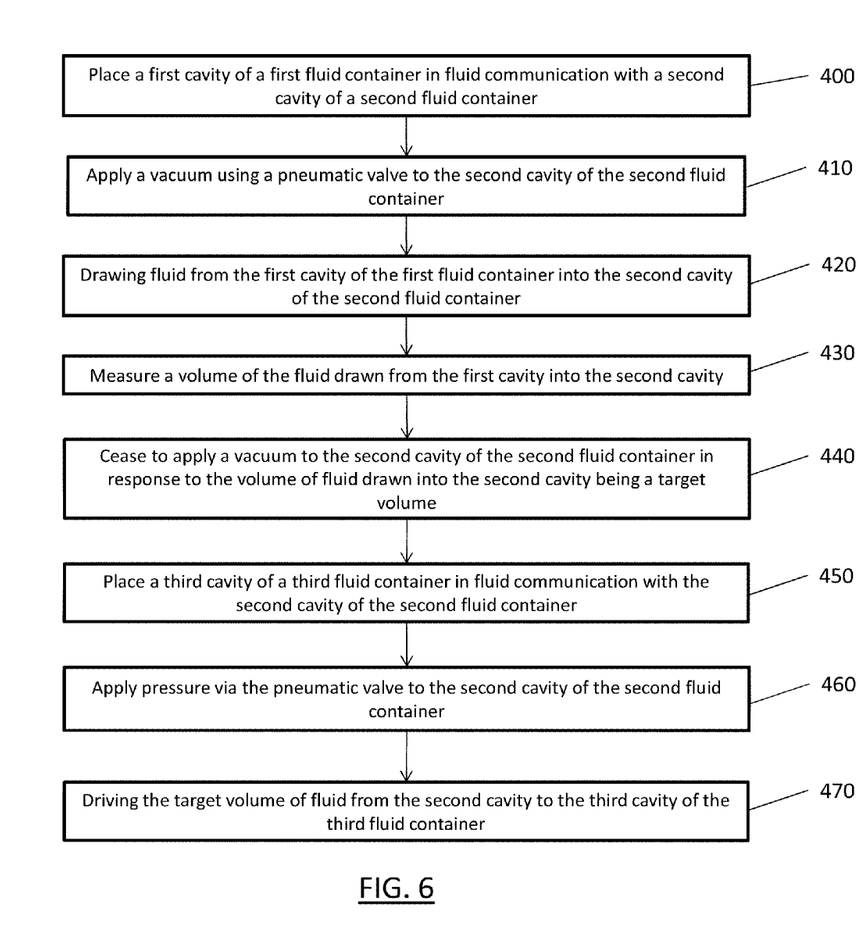
FIG. 6 is a flowchart of a method for controlling an interim volume verification system according to an example embodiment of the present invention.

FIG. 6 illustrates a flowchart according to an example method for interim volume verification according to some example embodiments. In this regard, FIG. 6 illustrates a method that may be at least partially performed by interim volume verification system 110. The operations illustrated in and described with respect to FIG. 6 may, for example, be performed by, with the assistance of, and/or under the control of one or more of the processor 200, memory 215, communication interface 220, or user interface 205. Operation 400 may include placing a first cavity of a first fluid container in fluid communication with a second cavity of a second fluid container. A vacuum may be applied via a pneumatic valve to the second cavity of the second fluid container at 410. The pneumatic valve may be controlled, for example, by controller 100. Fluid may be drawn from the first cavity of the first fluid container, which may be a fluid source container, into the second cavity of the second fluid container, which may be an interim volume fluid container at 420. The volume of fluid drawn from the first cavity into the second cavity may be measured at 430. In response to the volume of fluid drawn from the first cavity into the second cavity reaching a target volume, the pneumatic valve may cause the vacuum to cease to be applied to the first cavity of the first container at 440. A third cavity of a third fluid container may be placed in fluid communication with the second cavity of the second fluid container at 450. A positive pressure may be applied via the pneumatic valve to the second cavity of the second fluid container at 460, and the target volume of fluid may be driven from the second cavity to the third cavity of the third fluid container at 470. The third fluid container may be, for example, a medication delivery device, such as an intravenous bag.

The flowchart of FIG. 6 illustrates a system, method, and computer program product according to example embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a server, desktop computer, laptop computer, mobile computer, or other computing device (e.g., interim volume system controller 100) and executed by a processor (e.g., the processor 200) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowchart support combinations of means for performing the specified functions and combinations of steps for performing the specified functions. It will also be understood that one or more blocks of the flowcharts, and combinations of blocks in the flowchart, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for volume verification of a medication, comprising:
 a first fluid container defining a first cavity;
 a second fluid container defining a second cavity;
 a volume measurement apparatus configured to determine a volume of fluid in the second fluid container;
 a third fluid container defining a third cavity;
 a pneumatic valve, wherein the pneumatic valve is in pneumatic communication with a vacuum and pressure source and with the second cavity of the second fluid container;
 a controller configured to control the pneumatic valve; and
 a display configured to present a volume measurement,
 wherein a target volume of fluid is caused by the controller to be drawn from the first cavity of the first fluid container to the second cavity of the second fluid container in response to the first cavity of the first fluid container being in fluid communication with the second cavity of the second container and the pneumatic valve moving to cause a vacuum to be applied to the second cavity of the second fluid container from the vacuum source;
 wherein the target volume of fluid is caused by the controller to be expelled to the third cavity of the third fluid container from the second fluid container in response to the third cavity of the third fluid container being in fluid communication with the second cavity of the second fluid container and the pneumatic valve moving to cause a pressure to be applied to the second cavity of the second fluid container from the pressure source.

2. The system of claim 1, wherein the controller is configured to receive an indication of the target volume, and wherein the controller is configured to control the pneumatic valve to draw the target volume of fluid into the second cavity of the second container in response to the controller receiving the indication of the target volume.

3. The system of claim 1, wherein the volume measurement apparatus comprises a capacitive sensor configured to read a fluid level of the second fluid container.

4. The system of claim 1, wherein the volume measurement apparatus comprises an optical sensor configured to read a fluid level of the second fluid container.

5. The system of claim 1, wherein the display is configured to present a volume measured by the volume measurement apparatus.

6. The system of claim 1, further comprising an image capture device configured to capture an image of the second fluid container with the first volume of fluid.

7. The system of claim 6, further comprising an image capture device configured to capture an image of the first fluid container.

8. The system of claim 7, wherein the image of the second fluid container with the target volume of fluid and the image of the first fluid container are stored as a record of a fluid transfer.

9. A method for volume verification of a medication comprising:
 placing a first cavity of a first fluid container in fluid communication with a second cavity of a second fluid container;
 applying a vacuum, using a pneumatic valve in communication with a vacuum and pressure source, to the second cavity of the second fluid container;
 drawing fluid from the first cavity of the first fluid container into the second cavity of the second fluid container in response to the vacuum being applied to the second fluid container;
 measuring a volume of the fluid drawn from the first cavity into the second cavity;
 ceasing to apply a vacuum to the second cavity of the second fluid container in response to the volume of fluid drawn into the second cavity being a target volume;
 placing a third cavity of a third fluid container in fluid communication with the second cavity of the second fluid container;
 applying pressure, using the pneumatic valve, to the second cavity of the second fluid container; and
 driving the target volume of fluid from the second cavity to the third cavity of the third fluid container.

10. The method of claim 9, wherein the pneumatic valve is controlled by a controller, and wherein the volume is measured using the controller.

11. The method of claim 9, wherein measuring the volume of fluid drawn into the second cavity is performed by a capacitive sensor configured to read a fluid level of the second fluid container.

12. The method of claim 9, wherein measuring the volume of fluid drawn into the second cavity is performed by an optical sensor configured to read a fluid level of the second fluid container.

13. The method of claim 9, further comprising capturing an image of the second fluid container with the target volume of fluid.

14. The method of claim 13, further comprising capturing an image of the first fluid container.

15. The method of claim 14, further comprising storing the image of the second fluid container with the target volume of fluid and the image of the first fluid container in a record of a fluid transfer.

16. The method of claim 9, further comprising:
 causing a label to be printed for the third fluid container including an indication of the target volume.

17. The method of claim 9, further comprising receiving a target volume and a fluid type.

18. The method of claim 17, further comprising receiving an identification of the first fluid container including a type of fluid contained therein.

19. The method of claim 18, further comprising verifying that the type of fluid of the first fluid container corresponds to the fluid type.

* * * * *